United States Patent Office 3,060,043
Patented Oct. 23, 1962

3,060,043
REFRACTORY CASTABLE
Albert L. Renkey, Pittsburgh, Pa., assignor to Harbison-Walker Refractories Company, Pittsburgh, Pa., a corporation of Pennsylvania
No Drawing. Filed Mar. 31, 1960, Ser. No. 18,863
7 Claims. (Cl. 106—64)

This invention relates to refractory castables composed of a heat-resistant aggregate and a heat-resistant hydraulic cement. More particularly, this invention relates to refractory castables which exhibit exceptional strength and abrasion resistance at low and intermediate temperatures.

Castables are refractories which are mixed and poured like concrete. They consist of ground refractory materials containing a suitable percentage of added bonding agents. They are shipped in dry form. For use, they are blended with water to the desired consistency and then poured or tamped into place or applied by means of an air gun. Castables are especially suited for furnace linings of irregular dimensions, for patching brickwork, and for casting special shapes.

Certain applications of castables, for example linings in refinery cyclones, where operating temperatures are about 900° F. to 1500° F., require high strength and extreme abrasion resistance in the castable. However, at these temperatures, high strength ceramic bonds do not develop, but rather the bond strength of the castable is largely limited to that obtained from the cement used.

The intermediate temperature range of about 500° to 2000° F. for such castable applications makes it apparent to the artisan that Portland type cements are wholly unusable as a bonding material no matter how refractory the aggregate used. Castables composed of crome ore or fused or calcined high alumina materials as the aggregate and calcium aluminate cement as the bond have been used where high strength and abrasion resistance were desired. Although these castables have had a limited acceptance, a product showing marked superiority in these characteristics, particularly at low and intermediate temperatures ranges, would be particularly useful.

It is therefore a major object of the present invention to provide refractory castable compositions that are characterized by exceptional strength and abrasion resistance at low and intermediate operating temperatures.

In accordance with my invention, the strength and abrasion resistance, at low and intermediate temperatures, of refractory castables comprising refractory aggregates and a calcium aluminate cement are markedly improved by including a small amount of very fine, amorphous silica in the batch. A minimum of about 1 weight percent, based on the weight of the solids content of the resultant mixture, is sufficient to bring about sharp improvement in these properties, with an amount of 2 to 3 weight percent constituting the preferred addition. Improvement has been noted when using amounts up to about 5 weight percent. Surprisingly, however, amounts greater than about 5 percent are of no aid, and in fact, as will be shown by data discussed hereinafter, amounts of 6 and 8 weight percent quite generally weaken the resulting structure below that level it would have had without any of the silica whatsoever.

The silica that is used in practicing the present invention is known as volatilized silica or fume silica. Such materials are made, for example, as the silica condensate collected from furnaces manufacturing silicon alloys such as ferrosilicon. As used in this invention, the silica is substantially all finer than 325 Tyler mesh (44 microns) and over half is finer than 10 microns. Chemically, the material is at least 90 percent $SiO_2$ and commonly is about 95 percent $SiO_2$ with about 2 to 3 percent of a combination of iron oxide, magnesium oxide and aluminum oxide and about 2 percent ignition loss. Carbon may comprise much of the latter. These materials generally are considered amorphous, though it will be appreciated that some degree of crystallinity may be present.

The castable compositions include, in addition to the cement and silica, heat resistant aggregates in an amount of about 55 to 90 percent by weight, based on the solids content of the castable. Preferably, an aggregate such as chrome ore is used. However, other heat resistant materials such as calcined or fired alumina, calcined bauxite, calcined kyanite, silicon carbide, and similarly strong refractory aggregates have been used successfully, singly and in combination. Accordingly, it will be appreciated that substantially any high temperature aggregate can be used, with the actual choice being dictated by the desires of the operator and the economics involved. Since the service temperatures are in some cases low enough, it is also possible to use expanded clay or shale aggregates such as Haydite. Such plasticizing ingredients as clay, while not essential in castable compositions, can be included in relatively small amounts, i.e., on the order of up to about 5 percent, as desired. Bentonite is sometimes satisfactory within this range.

The heat resistant cement used in producing castables for use at low and intermediate temperatures as in this invention is calcium aluminate cement and comprises about 9 to 40 weight percent of the castable, on a solids basis. Such cements are available commercially. Those used can have a CaO to $Al_2O_3$ ratio by weight of 1:1, though higher or lower ratios can be used as desired. To represent this aspect of the invention in the examples given hereinafter, a high alumina cement as well as one having a 1:1 CaO to $Al_2O_3$ ratio was used. Generally, the cement is used in a size such that it passes a 100 mesh Tyler screen with over one-half of it being finer than 200 mesh.

Cement No. 1 represents an inexpensive, readily available calcium aluminate cement having a CaO to $Al_2O_3$ ratio by weight of 1:1, but which is fairly impure. Cements of this type are available wherein the impurities, particularly the iron, have been substantially removed. These cements, of course, are more expensive but they do possess the advantage of higher refractoriness and will be used where this property is a factor to be considered.

Cement No. 2 represents a commercially available calcium aluminate cement of high purity in which the CaO to $Al_2O_3$ ratio by weight is about 1:4.

The invention will be exemplified by way of specific examples. In these examples as noted above, two different cements were used. The chemical analysis of each is as follows:

|  | Cement No. 1, percent | Cement No. 2, percent |
|---|---|---|
| $SiO_2$ | 9.3 | 0.1 |
| $Al_2O_3$ | 39.2 | 80.0 |
| $Fe_2O_3$ | 5.4 | 0.4 |
| $FeO$ | 5.8 |  |
| $CaO$ | 39.3 | 18.0 |
| $MgO$ | 1.0 | 0.4 |
| $SO_3$ | 0.16 | 0.06 |
| Ign. Loss |  | 1.0 |

In the examples represented by the data in Tables I and II, Philippine chrome ore was used as the aggregate. A typical chemical analysis is as follows:

|  | Percent |
|---|---|
| $SiO_2$ | 4.9 |
| $Al_2O_3$ | 29.9 |
| $FeO$ | 12.8 |
| $Cr_2O_3$ | 32.4 |
| $CaO$ | 0.5 |
| $MgO$ | 17.8 |
| Loss | 0.9 |

In the chrome ore examples, the components were sized and thoroughly blended to give a grind as follows:

|  | Percent |
|---|---|
| +6 mesh | 17 |
| −6+28 | 30 |
| −28+65 | 8 |
| −65 | 45 |

About 8 to 15 percent water, based on the total weight of the batch, was added and the ingredients mixed well. Each batch was then cast into brick, 9 x 4½ x 2½ inches, for testing. All the mixes showed good workability and developed good set after remaining in the molds overnight. These brick were then tested to ascertain their physical properties at various temperatures. Samples were first tested after drying overnight, i.e., about ten hours, at 230° F. Other samples were tested after being heated for five hours at 1000° F and 1500° F., respectively.

Tables I and II give examples of compositions of chrome ore, cement No. 1, and volatilized silica that illustrate the greatly increased strength at several service temperatures which can be imparted to a chrome castable by the addition of up to about 5 percent volatilized silica as in this invention. These compositions give products having a density of about 155 to 165 lbs./cu. ft.

*Table I*

|  | A | B | C | D | E | F |
|---|---|---|---|---|---|---|
| Philippine Chrome Ore | 65 | 63 | 62 | 61 | 59 | 57 |
| Cement No. 1 | 35 | 35 | 35 | 35 | 35 | 35 |
| Volatilized Silica |  | 2 | 3 | 4 | 6 | 8 |
| Water (added), percent | 11.6 | 12.5 | 11.7 | 14 | 14.5 | 15 |
| Transverse Strength—Modulus of rupture (p.s.i.): |  |  |  |  |  |  |
| After drying at 230° F | 1,020 | 1,130 | 1,170 | 1,100 | 840 | 510 |
| After heating at 1,000° F | 650 | 670 | 750 | 720 | 520 | 290 |
| After heating at 1,500° F | 580 | 760 | 890 | 790 | 580 | 300 |
| Cold crushing strength (p.s.i.):[1] |  |  |  |  |  |  |
| After drying at 230° F |  |  |  |  |  |  |
| After heating at 1,000° F |  |  |  |  |  |  |
| After heating at 1,500° F |  |  |  |  |  |  |
| After heating at 1,000° F.: Percent linear change | −0.3 | −0.2 | −0.2 | −0.2 | −0.3 | −0.3 |
| After heating at 1,500° F.: Percent linear change | −0.3 | −0.2 | −0.3 | −0.3 | −0.3 | −0.5 |

[1] Not taken.

*Table II*

|  | G | H | I | J | K |
|---|---|---|---|---|---|
| Philippine Chrome Ore | 85 | 83 | 81 | 79 | 77 |
| Cement No. 1 | 15 | 15 | 15 | 15 | 15 |
| Volatilized Silica |  | 2 | 4 | 6 | 8 |
| Water (added), percent | 10.9 | 10.5 | 11.6 | 11.9 | 13.6 |
| Transverse Strength—Modulus of rupture (p.s.i.): |  |  |  |  |  |
| After drying at 230° F | 500 | 750 | 720 | 490 | 370 |
| After heating at 1,000° F | 330 | 500 | 480 | 300 | 270 |
| After heating at 1,500° F | 250 | 400 | 360 | 200 | 190 |
| Cold crushing strength (p.s.i.): |  |  |  |  |  |
| After drying at 230° F | 2,130 | 2,270 | 2,230 | 1,930 | 1,620 |
| After heating at 1,000° F | 1,850 | 1,930 | 1,900 | 1,770 | 1,190 |
| After heating at 1,500° F | 1,820 | 2,150 | 2,030 | 1,750 | 1,420 |
| After heating at 1,000° F: Percent linear change | −0.6 | −0.3 | −0.2 | −0.2 | −0.2 |
| After heating at 1,500° F.: Percent linear change | −0.2 | −0.4 | −0.3 | −0.3 | −0.3 |

Cold crushing strength is one of the basic measurements in ceramic studies. It is determined with simple apparatus, has a good degree of reproducibility, and is an extremely sensitive measure of bonding strength. This property has even greater interest because it has been shown to bear a fairly direct relation to abrasion resistance. Therefore, its determination can be made in lieu of abrasion testing which requires more elaborate equipment.

Transverse strength of refractory bodies, measured as modulus of rupture, has also been observed to show a general relation to abrasion resistance. Since failure occurs in tension, this measurement is a fairly pure measurement of the quality of the bond.

To spot-check the data of Table I, mixes A and C were tested in an abradability apparatus. This consisted of means for sandblasting standard sized silicon carbide grains at standard blast conditions against a section of the cast refractory held at a 45° angle. The following data show the volume of the refractory, in cubic centimeters, eroded after receiving a blast of .14 lbs. of the silicon carbide grain. The results for mixes A and C show that the 3 percent silica addition considerably reduced the amount of abrasion.

|  | A | C |
|---|---|---|
| Abradability, volume loss (cc.): |  |  |
| After drying at 230° F | 3.79 | 3.40 |
| After heating at 1,500° F | 7.08 | 6.36 |

It can be observed from the data of Tables I and II that the transverse strength of modulus of rupture of the samples showed a marked increase at the temperatures tested when small additions of volatilized silica were made. In all cases, additions up through 4 percent gave a stronger body than the standard mix. These data also show (compare E and F with A, and J and K with G) the criticality of staying within the specified range of silica addition to avoid deleterious effects on the product. The linear change data at 1000° F. and 1500° F. are chiefly of interest in showing that shrinkage was not increased by the use of volatilized silica below 6%. This characteristic is routinely checked in studies of refractory castables.

Table III lists compositions of chrome ore, cement No. 2, and volatilized silica which illustrate the influence of the addition of volatilized silica on the strength and abrasion resistance of a chrome castable. These compositions give products having a density of about 170 to 180 lbs./cu. ft. Enough water was added to give a suitable casting consistency, this requiring about 8 to 9 percent on the dry weight basis.

Table III

|  | L | M | N | O | P | Q | R |
|---|---|---|---|---|---|---|---|
| Philippine Chrome Ore | 80 | 77 | 75 | 73.5 | 72 | 70 | 67 |
| Cement No. 2 | 20 | 20 | 25 | 25 | 25 | 30 | 30 |
| Volatilized Silica |  | 3 |  | 1.5 | 3 |  | 3 |
| Modulus of rupture (p.s.i.): |  |  |  |  |  |  |  |
| After drying at 230° F | 1,160 | 1,350 | 1,480 | 1,510 | 1,650 | 1,500 | 1,710 |
| After heating at 1,000° F | 1,060 | 1,570 | 1,830 | 1,910 | 2,010 | 1,910 | 2,050 |
| After heating at 1,500° F | 1,090 | 1,570 | 1,140 | 1,650 | 1,330 | 1,270 | 1,580 |
| Cold crushing strength (p.s.i.): |  |  |  |  |  |  |  |
| After drying at 230° F | 5,020 | 8,720 | 6,470 | 10,200 | 9,930 | 6,920 | 10,900 |
| After heating at 1,000° F | 3,982 | 6,170 | 6,296 | 7,275 | 7,490 | 6,550 | 7,750 |
| After heating at 1,500° F | 3,080 | 5,540 | 6,070 | 5,710 | 5,240 | 6,330 | 9,010 |
| Abradability, volume loss (cc.): |  |  |  |  |  |  |  |
| After drying at 230° F | 5.92 | 3.93 | 3.76 | 3.48 | 3.19 | 3.07 | 2.19 |
| After heating at 1,000° F | 6.50 | 4.34 | 4.56 | 4.00 | 3.01 | 4.17 | 2.35 |
| After heating at 1,500° F | 11.18 | 9.01 | 5.90 | 4.69 | 3.83 | 5.72 | 2.28 |

The results in Table III again demonstrate the effectiveness of additions of volatilized silica in increasing the strength and abrasion resistance of a chrome castable at low and intermediate temperatures. It will be observed that the high alumina, calcium aluminate cement gives an inherently stronger castable than the less pure cement of Tables I and II. The same relative advantage is imparted through the additions of volatilized silica, although percentagewise the improvement was even more marked than in the prior examples.

In the following examples, calcined alumina, whose typical chemical analysis is as follows, comprised the aggregate:

| | Percent |
|---|---|
| $SiO$ | 0.03 |
| $Al_2O_3$ | 99.5 |
| $TiO_2$ | 0.003 |
| $Fe_2O_3$ | 0.2 |
| $CaO$ | 0.08 |
| $MgO$ | 0.03 |
| Alkalies | Trace |

The constituents were sized and thoroughly blended to give a standard mix for a high alumina castable, as follows:

| | Percent |
|---|---|
| +10 mesh | 25 |
| −10+28 | 27 |
| −28+65 | 8 |
| −65 | 40 |

About 7 to 10 percent water, based on the total weight of the batch, was added and the components mixed thoroughly. Each batch was then cast and tested in the same manner as were the chrome castables. Table IV gives examples of compositions of calcined alumina, cement No. 2, and volatilized silica. These mixes give products having a density of about 165 to 170 lbs./cu. ft.

Table IV

|  | S | T | U | V |
|---|---|---|---|---|
| Calcined Alumina, percent | 75 | 73.5 | 72 | 70 |
| Cement No. 2, percent | 25 | 25 | 25 | 25 |
| Volatilized Silica, percent |  | 1.5 | 3.0 | 5.0 |
| Water (added), percent | 9.0 | 8.3 | 7.9 | 7.5 |
| Modulus of rupture (p.s.i.): |  |  |  |  |
| After drying at 230° F | 1,670 | 2,090 | 1,790 | 1,700 |
| After heating at 1,000° F | 2,040 | 2,170 | 2,630 | 2,100 |
| After heating at 1,500° F | 1,210 | 2,040 | 2,380 | 1,300 |
| Cold crushing strength (p.s.i.): |  |  |  |  |
| After drying at 230° F | 6,040 | 8,730 | 9,680 | 7,200 |
| After heating at 1,000° F | 6,710 | 7,340 | 8,530 | 6,880 |
| After heating at 1,500° F | 5,200 | 7,790 | 8,990 | 5,600 |
| Abradability, volume loss (cc.): |  |  |  |  |
| After drying at 230° F | 2.81 | 2.22 | 2.32 | 2.75 |
| After heating at 1,000° F | 4.41 | 3.82 | 2.91 |  |
| After heating at 1,500° F | 8.10 | 3.88 | 2.60 | 7.63 |

These data again demonstrate the marked improvement in modulus of rupture, cold crushing strength, and abrasion resistance when very fine, amorphous silica is added to a refractory castable in which calcium aluminate cement is the bond. As in the case of the chrome castables, it can be observed that the additions of silica up to 5 percent are beneficial with the maximum effect being felt at about 2 to 3 percent.

From the foregoing data and discussion, it is evident that my invention provides a simple manner of developing markedly improved strength and abrasion resistance, at low and intermediate temperatures, in refractory castables. The invention is considered particularly surprising in that a sharp cut-off point of useful additions of the silica has been found. In the foregoing discussion, all percentages given are by weight unless otherwise indicated.

In accordance with the provisions of the patent statutes, I have explained the principle of my invention and have described what I consider to represent its best embodiment. However, I desire to have it understood that, within the scope of the appended claims, the invention may be practiced otherwise than as specifically described.

I claim:

1. A refractory castable for use in the temperature range of about 500 to 2000° F. and characterized by having improved strength and abrasion resistance consisting essentially of, by weight, about 55 to 90 percent of a heat resistant aggregate, about 9 to 40 percent of calcium aluminate cement and about 1 to 5 percent of volatilized silica, the total comprising 100 per cent, the CaO to $Al_2O_3$ ratio, by weight, in the calcium aluminate cement being at least 1:1.

2. A refractory castable in accordance with claim 1 in which said silica content comprises about 2 to 3 percent of the composition.

3. A refractory castable composition characterized by having improved strength and abrasion resistance and consisting essentially, by weight, of about 55 to 90 percent of chrome ore, about 9 to 40 percent of calcium aluminate cement and about 1 to 5 percent of volatilized silica, the total comprising 100 percent, the CaO to $Al_2O_3$ ratio, by weight, in the calcium aluminate cement being from about 1:1 to about 1:4.

4. A refractory castable composition characterized by having improved strength and abrasion resistance and consisting essentially, by weight, of 55 to 90 percent of calcined alumina, about 9 to 40 percent of calcium aluminate cement and about 1 to 5 percent of volatilized silica, the total comprising 100 percent, the CaO to $Al_2O_3$ ratio, by weight, in the calcium aluminate cement being from about 1:1 to about 1:4.

5. A composition in accordance with claim 3 in which said silica content is 2 to about 3 percent of said composition.

6. A composition in accordance with claim 5 in which said calcium aluminate cement is of high alumina content.

7. A composition in accordance with claim 4 in which said silica is present in an amount of about 3 percent.

References Cited in the file of this patent
UNITED STATES PATENTS

| | | |
|---|---|---|
| 2,428,178 | Reik et al. | Sept. 30, 1947 |
| 2,511,725 | Lobaugh | June 13, 1950 |
| 2,527,500 | Norton et al. | Oct. 24, 1950 |
| 2,558,782 | Ratcliffe | July 3, 1951 |
| 2,736,660 | Barlow | Feb. 28, 1956 |
| 2,874,071 | Kadisch | Feb. 17, 1959 |